US005196263A

United States Patent [19]
Melby et al.

[11] Patent Number: 5,196,263
[45] Date of Patent: Mar. 23, 1993

[54] RUBBER ARTICLES HAVING A TEXTURED SURFACE AND A METHOD FOR THEIR PREPARATION

[75] Inventors: Dennis W. Melby, Mogadore; James C. Moore, Ravenna, both of Ohio

[73] Assignee: H & M Rubber Company, Inc., Kent, Ohio

[21] Appl. No.: 782,133

[22] Filed: Oct. 25, 1991

[51] Int. Cl.$^5$ .............................................. B32B 5/16
[52] U.S. Cl. ........................................ 428/327; 428/493;
525/236; 2/168; 128/205.17
[58] Field of Search ............... 428/327, 493; 525/236;
2/168; 128/205.17

[56] References Cited
U.S. PATENT DOCUMENTS

| | | | |
|---|---|---|---|
| 2,120,406 | 6/1938 | Hansen | 2/168 |
| 2,139,545 | 12/1938 | Gammeter | 428/493 |
| 2,173,734 | 9/1939 | Sidnell | 2/168 |
| 4,713,420 | 12/1987 | Henton | 525/236 |
| 5,036,132 | 7/1991 | Coran | 525/236 |
| 5,039,750 | 8/1991 | Miller et al. | 2/168 |

*Primary Examiner*—Paul J. Thibodeau
*Assistant Examiner*—Mark A. Forman
*Attorney, Agent, or Firm*—Renner, Kenner, Greive, Bobak, Taylor & Weber

[57] ABSTRACT

A rubber article formed from a rubber composition having a rubber component is provided wherein the article has a texture coating thereon. A texture coating mixture is formed from a mixture of a rubber composition having a rubber component substantially the same as employed to form the rubber article, and rubber particles also having a rubber component substantially the same as that of the rubber article. A method of forming a rubber article is also provided which includes coating a rubber article with such a texture coating mixture.

10 Claims, 1 Drawing Sheet

U.S. Patent
Mar. 23, 1993
5,196,263
FIG. 1
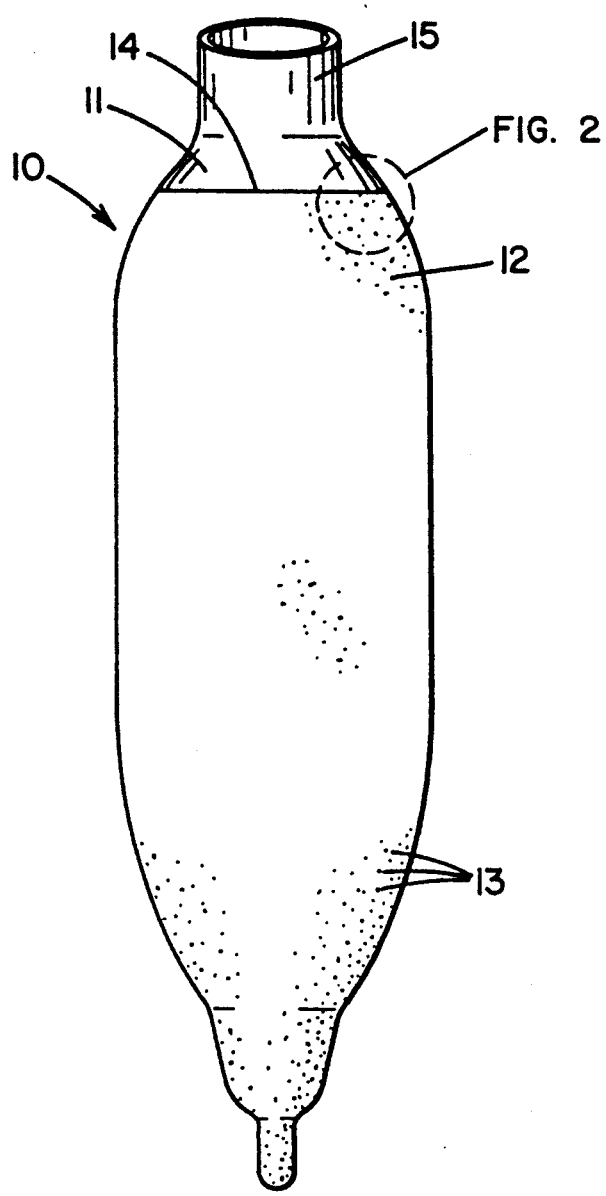
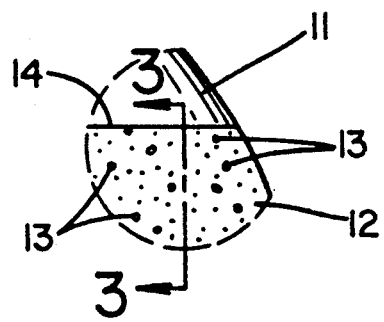
FIG. 2
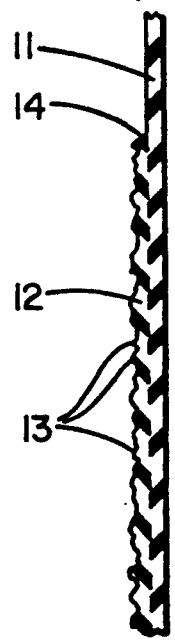
FIG. 3

1

RUBBER ARTICLES HAVING A TEXTURED SURFACE AND A METHOD FOR THEIR PREPARATION

TECHNICAL FIELD

The present invention generally relates to rubber or elastomeric articles and a method for their preparation. More particularly, the present invention relates to rubber articles having a textured surface. Specifically, the present invention relates to rubber articles having a textured surface formed from rubber particles substantially similar in composition to the rubber article.

BACKGROUND OF THE INVENTION

It is known to fabricate articles from various elastomers and rubbers including natural rubber such as latex, synthetic rubbers such as neoprene, and the like, and mixtures thereof. For example, for many years, "breather bags" for ventilation equipment have been fabricated from latex rubber compositions.

It has been found that when latex articles such as breather bags, are contacted with other rubber articles such as a latex glove, the two surfaces often slide relative to each other upon the application of forces having a tangential component. Because breather bags are often grasped and "pumped" (a medical procedure commonly referred to as "forced ventilation"), it is desirable to have a positive, non-slip contact with the bag.

It has been suggested to roughen the surface of breather bags to provide a more sure gripping surface. One such bag known in the art, is fabricated by dipping a mandrel in a conventional latex rubber composition, and then attacking or roughening the surface of the bag with a solvent and an acid such as glacial acetic acid. A major drawback of this process is the hazardous exposure and disposal characteristics of the solution. Similar acid roughening has been know for many years with respect to various rubber articles, and is known to weaken the rubber article itself. To be useful for ventilation equipment purposes, breather bags must be capable of elastically expanding to at least a 700 percent elongation. Chemical roughening of the bag makes this parameter difficult to reach, particularly in articles having a relatively thin wall thickness.

Furthermore, chemical roughening agents may leave a residue upon the article which may be detrimental to the article itself and also to the end use application of the article.

Therefore, a need exists for a rubber article which has a textured surface, and a method for producing the article by other than acid roughening or other chemical roughening means.

DISCLOSURE OF THE INVENTION

It is therefore, an object of the present invention to provide a rubber article which is textured over all or a portion of the surface thereof.

It is another object of the present invention to provide an article as above, which is textured without chemical roughening.

It is a further object of the present invention to provide a method of forming a rubber article which is textured over all or a portion of the surface thereof.

It is still another object of the invention to provide a vulcanizable composition useful for coating a rubber article to provide the article with a textured surface.

In general, a vulcanizable rubber article of the type formed from a vulcanizable rubber composition having a rubber component, comprises the improvement of a texturing layer on the surface of the article, the texturing layer having a modulus of elasticity at least equal to that of the rubber article. The texturing layer comprises a mixture of from about 90 to about 70 parts by weight of a vulcanizable rubber composition and from about 10 to about 30 parts by weight of vulcanizable rubber particles. The vulcanizable rubber composition of the texturing layer and of the vulcanizable rubber particles each have a rubber component which is substantially the same as the rubber component of the vulcanizable rubber article.

There is also provided according to the present invention, a method of forming a rubber article having a textured surface which comprises the steps of forming a substrate in the shape of the desired article from a first vulcanizable rubber composition having a rubber component, and coating the substrate with a texturing coating mixture. The texturing coating mixture comprises from about 90 to about 70 parts by weight of a second vulcanizable rubber composition having a rubber component, and from about 10 to about 30 parts by weight of a plurality of vulcanizable rubber particles. The second vulcanizable rubber composition and the rubber particles each have the same rubber component as the first vulcanizable rubber composition. The method also includes vulcanizing the rubber article.

A composition also according to the present invention, for coating a rubber article of the type formed from a vulcanizable rubber composition having a rubber component, comprises from about 90 to about 70 parts by weight of a vulcanizable rubber composition having a rubber component substantially similar to the rubber component of the rubber article, and from about 10 to about 30 parts by weight of a plurality of vulcanizable rubber particles having a rubber component substantially similar to the rubber component of the rubber article.

These and other objects, together with the advantages over the known rubber articles, compositions and methods shall become apparent from the specification which follows and are accomplished by the invention as hereinafter described and claimed.

BRIEF DESCRIPTION OF THE DRAWINGS

FIG. 1 is an elevational view of an exemplary breather bag embodying the concepts of the present invention shown in a partially inflated condition with a textured coating layer over the substrate of the bag extending from the bottom into the upper neck of the bag.

FIG. 2 is an enlarged fragmentary view of the breather bag of FIG. 1 taken substantially in the area indicated on FIG. 1 at the transition between the portion of the bag with and without the textured coating layer.

FIG. 3 is a further enlarged sectional view taken substantially along the line 3—3 of FIG. 2 through the wall of the bag and showing details of the substrate and the textured coating layer.

PREFERRED EMBODIMENT FOR CARRYING OUT THE INVENTION

A breather bag embodying the concepts of the present invention is generally indicated by the numeral 10 in the attached drawings. One skilled in the art will appreciate from the discussion to follow, that the invention has equal application to numerous rubber articles in addition to breather bags, such as rubber gloves, rubber hand holds, or any other rubber article upon which it is desired to provide a textured surface. Breather bag 10, therefore, is merely depicted in the drawings for exemplary purposes.

As will be more fully discussed hereinbelow, breather bag 10 includes a substrate 11, which substrate 11 is generally formed into the shape of the desired article. There is provided over substrate 11, a texturing coating layer 12, which includes a plurality of rubber particles 13 therein (FIG. 3). As shown, the texturing layer 12 extends from the bottom of the bag 10 to a line of demarcation 14 proximate to the upper neck 15 thereof. It is to be appreciated that all or varying portions of the bag 10 may be provided with the coating layer 12 depending upon the particular application for which an article is intended.

Breather bag 10 is configured from a conventional rubber composition, such as a latex rubber composition. As will be appreciated by one skilled in the art, the exact components of a conventional rubber composition are not critical to the practice of the present invention. It is required that the composition be vulcanizable and that it contain a rubber component. The rubber component may be natural rubber such as latex, synthetic rubber such as those discussed hereinabove, or mixtures thereof. By way of example only, and not by way of limiting the present invention, a conventional rubber composition useful for forming breather bags by dipping, or other such articles, is given in Table I hereinbelow.

TABLE I

| EXEMPLARY RUBBER COMPOSITION | |
|---|---|
| Ingredient | Approximate Dry Parts by Weight |
| Natural Latex | 75-85 |
| Fillers[a] | 10-20 |
| Sulfur Cure | 0.5-1 |
| Accelerator | 1-1.5 |
| Antioxidant | 0.75-1 |

[a]such as clay or the like

As will be appreciated, a conventional rubber composition may contain other components such as zinc oxide, colorants, extrenders, stabilizers and the like.

A rubber article such as breather bag 10 or the like, is often formed by dipping. As is well known in the art, a mandrel (not shown) is dipped into a quantity of the vulcanizable rubber composition which is a liquid. Upon being dried, such as by merely suspending the dipped mandrel for a period of time, the rubber composition dries or "sets" whereupon it may vulcanized.

The mandrel is first dipped into a coagulant, such as a solution of alcohol or heated water, and calcium nitrate. As is known in the art, the coagulant destroys soaps or sufactants which are attched to the rubber molecules and which would otherwise prevent the rubber molecules from adhering to each other and to the mandrel. The thickness of the rubber coating or coatings applied to the mandrel is dependent upon the strength of the coagulant, the viscosity of the rubber composition, and the dwell time of the mandrel within the liquid composition. Also, of course, the present invention has application to articles having multiple layers.

While it is possible to allow the dipped, vulcanizable rubber coated mandrel to air dry to set or partially set, it is preferred that immediately upon exiting the first dip, the rubber article be dipped into a texturing composition to be further discussed hereinbelow. As known in the art, the rubber article may then be leached to remove salts such as calcium nitrate from the coagulant, and it may then be vulcanized.

The texturing composition preferably contains a mixture of the same, or substantially the same, rubber composition as employed in the first dip to produce the substrate 11 of the article, and a plurality of rubber particles also produced from the same, or substantially the same, rubber composition as the substrate 11.

Furthermore, it is preferred that the texturing mixture have a modulus of elasticity when set at least equal to the modulus of elasticity of the substrate when set, as determined by any conventional method such as ASTM D412. It is desirable to have the vulcanized texturing coating have greater elasticity than the substrate, otherwise, declamation may occur when the substrate is stretched to its elastic limit. Therefore, it is preferred to soften the texturing coating mixture with for example, another rubber composition preselected to have a lower modulus of electricity.

The rubber particles are preferably formed by grinding rubber sheets or blocks (such as from scrap materials) which preferably, also have the same or greater elasticity than the substrate. The rubber particles may include vulcanized rubber or vulcanizable rubber or a mixture of both. With respect to the rubber particles for purposes of this disclosure, the term "vulcanizable" shall be understood to relate equally to rubber particles that have already been vulcanized, and those which may be vulcanized. It is possible however, to employ particles that have not yet been vulcanized. The size to which the rubber is ground is dependent upon the end use application of the invention, but it is generally preferred that the particles have a mesh size of about 15 or higher, with a mesh of 22 or higher being preferred. Grinding may be accomplished by any known technique, such as by freezing the rubber and then ball mill grinding.

When the rubber is ground, especially when ground scrap materials are used, surfaces of the rubber may be exposed that have not been sufficiently leached. That is, below the surface of the leached rubber, salts from the coagulant, or the like, will remain. Hence, it is preferred to leach the ground particles.

The leached rubber particles do not have appreciable amounts of soaps or surfactants and will have a tendency to agglomerate. For reasons to be more fully appreciated from the discussion to follow, it is desired to prevent such an agglomeration. It has been found that by oxidizing the surfaces of the particles, agglomeration can be avoided. Oxidation may be accomplished by any method known in the art. One preferred method includes agitating the particles in a solution of chlorine and water. One preferred concentration of chlorine and water is 1 to 1.5 million parts of chlorine in water, as tested for example, with a Hellige Twin-Kit Chlorine Comparator, employing Hellige O.-Tolidine No. R-420.

The ground and surface oxidized rubber particles, in a slurry to be described hereinbelow, are then mixed with the conventional rubber composition. While the exact amounts of each component will vary depending upon the end use application, one preferred mixture includes from about 90 to about 70 parts by weight of natural latex and from about 10 to about 30 parts by weight of ground natural latex.

The mandrell is dipped into the texturing coating mixture as discussed hereinabove, with the thickness of the texturing composition being dependent upon the viscosity of the rubber composition, and the dwell time of the mandrel in the texturing composition.

Next, the mandrel is air dried then preferably leached to remove any remaining salts. The article formed on the mandrel may then be vulcanized by any conventional method known in the art, preferably by heat.

The slurry of the texturing composition, as discussed hereinabove, contains a quantity of oxidized ground rubber particles having a mesh size preferably, of about 22 or finer. After oxidization, the particles are dried just enough to permit sifting and easy handling to strain to the desired mesh size. From about 45 to about 55 parts by weight of water is added back to about 55 to about 45 parts by weight of the particles to facilitate stirring thereof. A conventional rubber thickener, such as xanthan gum or the like in an amount for example of from about 0.02 to 0.04 parts by weight, may be added to thicken the mixture to keep the particles in a random dispersion. That is, the particles may have a tendency to settle or form agglomerations, and the thicker the composition the lesser is the tendency to form such agglomerations. The thickener also helps to promote a more even coating upon the substrate. As will be appreciated by one skilled in the art, any thickener which will accomplish this task is within the scope of the invention. Also, a soap, such as Monocol S, should be added to randomize the particles.

To from about 10 to about 30 parts by weight of a conventional rubber composition having a rubber component selected to be the same as the rubber component of the rubber article which is to be provided with a textured surface, there is added the mixture containing the rubber particles, water and thickener in the amounts as discussed hereinabove. Furthermore, it is also preferred that the rubber particles also include a rubber component which is substantially the same as that of the rubber article. Because the components are contacted in pre-vulcanized condition, and because of their substantial similarity in the selected rubber component, adhesion between the components is enhanced. Furthermore, the liquid rubber component of the texturing layer encapsulates the rubber particles as shown on the attached drawings (FIG. 3). There is therefore, adhesion of rubber particles to the rubber article itself and an encapsulating layer of rubber over the particles which layer is itself adhered to the rubber article. Because of this double-adhesive action, after volcanization there is a reduced likelihood that the rubber particles will be delaminated from the rubber article.

It is preferred that when the rubber composition is added to the rubber particles to form the texturing mixture, the pH of the mixture be adjusted to from about 10.5 to about 11.0 with about 10.5 being preferred. This is done to help prevent agglomeration of the particles to themselves, and may be accomplished with ammonia or other pH adjuster.

Furthermore, it has been found that by adjusting the precure of the texturing mixture to approximately 2 to 2 (+), as will be understood by one skilled in the art, by adding any conventional cure catalyst, such as sulfur, adhesion of the texturing composition to the rubber article is further enhanced.

GENERAL EXPERIMENTAL

In order to demonstrate the effectiveness of the present invention in fulfilling the objects as set forth hereinabove, a breather bag was formed and coated with a texturing coating mixture in a manner substantially as described hereinabove.

A mandrel is dipped in a heated (60 to 70 degrees Celsius coagulant solution) and air dried for about 10 to 20 seconds. The mandrel is then dipped into a conventional vulcanizable latex composition at ambient temperature containing about 85 percent by weight of natural latex, with the remaining 15 percent by weight including accelerators, sulfur curing agents, antioxidants and the like, as is conventional in the art. The viscosity of the latex composition is preselected and controlled, such that the set rubber composition has a viscosity which requires about 17 to 35 seconds to pass a Zahn No. 2 cup. The mandrel is allowed to dwell within the rubber composition for about 0.1 to 1.0 minute, forming a thickness of latex onto the mandrel of about 0.010 to about 0.015 inches.

Immediately upon being removed from the first rubber composition, the mandrel is dipped into a mixture containing from about 10 to 30 parts by weight of ground latex particles, 90 to 70 parts by weight of a vulcanizable rubber composition, 0.03 parts by weight of Monocol S, and, 0.24 parts by weight of xanthan gum. The pH of the mixture is adjusted to about 10.5 with ammonia or other appropriate pH adjuster.

The mandrel is allowed to dwell within the texturing mixture for about 10 to 20 seconds to form a thickness of about 0.003 to about 0.005 inches. The rubber article upon the mandrel is then leached in a heated water bath for about 10 to 15 minutes, and then heat vulcanized.

After being removed from the mandrel, the rubber article is capable of 700 percent expansion without the rubber particles being delaminated therefrom. Furthermore, the rubber particles are randomly distributed upon the entire surface of the article that was dipped into the texturing composition.

Thus it should be evident that the compositions and methods of the present invention are highly effective in forming a rubber article having a textured surface. The invention is particularly suited for breather bags, gloves and the like, but is not necessarily limited thereto. The device and method of the present invention can be used separately with other equipment, methods and the like, as well for the manufacture of other than natural rubber materials.

Based upon the foregoing disclosure, it should now be apparent that the use of the compositions described herein will carry out the objects set forth hereinabove. It is, therefore, to be understood that any evident variations fall within the scope of the claimed invention and thus, the selection of specific component elements can be determined without departing from the spirit of the invention herein disclosed and described. In particular, vulcanizable rubber compositions, thickeners, soaps, surfactants, cure catalysts, oxidizing agents and the like as discussed hereinabove, are not necessarily limited to those having been actually described, and will include all such materials conventional in the vulcanizable rubber article art. Moreover, other means for grinding and chlorinating the rubber particles, forming the rubber article, and the like, can be substituted for the exemplary techniques discussed hereinabove. Thus, the scope of the invention shall include all modifications and variations that may fall within the scope of the attached claims.

What is claimed is:

1. In an expandable, vulcanizable rubber article of the type formed from a vulcanizable rubber composition having a rubber component, the improvement comprising a texturing layer on the surface of the article, said texturing layer having a modulus of elasticity at least equal to that of the rubber article and comprising a mixture of from about 90 to about 70 parts by weight of a vulcanizable rubber composition and from about 10 to about 30 parts by weight of vulcanizable rubber particles; wherein said vulcanizable rubber composition of said texturing layer and said vulcanizable rubber particles each have a rubber component which is substantially the same as the rubber component of the vulcanizable rubber article such that said rubber article is capable of up to 700 percent expansion without substantial delamination of said rubber particles therefrom.

2. A vulcanizable rubber article, as set forth in claim 1, wherein said rubber component of said vulcanizable rubber composition of said overcoat layer and said rubber component of said vulcanizable rubber particles are selected from the group consisting of natural rubber, synthetic rubbers and mixtures thereof.

3. A vulcanizable rubber article, as set forth in claim 2, wherein said natural rubber is latex.

4. A vulcanizable rubber article, as set forth in claim 2, wherein said synthetic rubber is neoprene.

5. A vulcanizable rubber article, as set forth in claim 2, wherein said rubber particles have a mesh size of greater than about 15.

6. A vulcanizable rubber article, as set forth in claim 5, wherein the surfaces of said rubber particles are oxidized.

7. A vulcanizable rubber article, as set forth in claim 1, wherein said overcoat layer further comprises a precure component.

8. A vulcanizable rubber article, as set forth in claim 7, wherein said precure component is sulfur.

9. A vulcanizable rubber article, as set forth in claim 1, wherein said vulcanizable rubber composition further comprises from about 0.02 to about 0.04 parts by weight of a thickening agent to promote and maintain random dispersion of said rubber particles.

10. A rubber breather bag of the type formed from a vulcanizable rubber composition having a rubber component, the improvement comprising a texturing layer on the surface of the rubber breather bag, said texturing layer having a modulus of elasticity at least equal to that of the rubber breather bag and comprising a mixture of from about 90 to about 70 parts by weight of a vulcanizable rubber composition and from about 10 to about 30 parts by weight of vulcanizable rubber particles; wherein said vulcanizable rubber composition of said texturing layer and said vulcanizable rubber particles each have a rubber component which is substantially the same as the rubber component of the rubber breather bag, such that the rubber breather bag is capable of up to 700 percent expansion without substantial delamination of said rubber particles therefrom.

* * * * *

UNITED STATES PATENT AND TRADEMARK OFFICE
CERTIFICATE OF CORRECTION

PATENT NO. : 5,196,263

DATED : March 23, 1993

INVENTOR(S) : Dennis W. Melby and James C. Moore

It is certified that error appears in the above-identified patent and that said Letters Patent is hereby corrected as shown below:

Column 1, line 41, "know" should read --known--.

Column 3, line 52, "extrenders," should read --extenders,--.

Column 3, line 63, "sufactants" should read --surfactants--; same line, "attched" should read --attached--.

Column 4, line 25, "declamination" should read --delamination--.

Column 4, line 29, "electricity" should read --elasticity--.

Column 5, line 9, "mandrell" should read --mandrel--.

Column 5, line 14, "dried then" should read --dried and then--.

Column 5, line 58, "volcanization" should read --vulcanization--.

Column 6, line 16, "Celsius coagulant solution)" should read --Celsius) coagulant solution--.

UNITED STATES PATENT AND TRADEMARK OFFICE
CERTIFICATE OF CORRECTION

PATENT NO. : 5,196,263

DATED : March 23, 1993

INVENTOR(S) : Dennis W. Melby and James C. Moore

It is certified that error appears in the above-indentified patent and that said Letters Patent is hereby corrected as shown below:

Column 6, line 16, "Celsius coagulant solution)" should read --Celsius) coagulant solution--.

Signed and Sealed this

Twenty-third Day of August, 1994

Attest:

Attesting Officer

BRUCE LEHMAN

Commissioner of Patents and Trademarks